US012657818B2

(12) United States Patent
Ren et al.

(10) Patent No.: US 12,657,818 B2
(45) Date of Patent: Jun. 16, 2026

(54) DISTORTION CORRECTION FOR ENVIRONMENT VISUALIZATIONS WITH WIDE ANGLE VIEWS

(71) Applicant: NVIDIA Corporation, Santa Clara, CA (US)

(72) Inventors: Yuzhuo Ren, Sunnyvale, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 346 days.

(21) Appl. No.: 18/221,018

(22) Filed: Jul. 12, 2023

(65) Prior Publication Data

US 2025/0022223 A1 Jan. 16, 2025

(51) Int. Cl.
*G06T 17/05* (2011.01)
*G06T 5/80* (2024.01)
(Continued)

(52) U.S. Cl.
CPC ............... *G06T 17/05* (2013.01); *G06T 5/80* (2024.01); *G06T 7/536* (2017.01); *G06T 15/20* (2013.01); *G06T 2207/20132* (2013.01)

(58) Field of Classification Search
CPC .... H04N 23/698; H04N 5/2628; H04N 1/387; G06T 3/4038; G06T 3/18;
(Continued)

(56) References Cited

U.S. PATENT DOCUMENTS 10,885,698 B2 1/2021 Muthler et al.
2014/0307967 A1* 10/2014 Kacher .............. G06V 30/1478
382/199
(Continued)

OTHER PUBLICATIONS

Sharpless, T.K., et al., "Pannini: A New Projection for Rendering Wide Angle Perspective Images", Computational Aesthetics in Graphics, Visualization, and Imaging, Retrieved from Internet URL: https://diglib.eg.org/bitstream/handle/10.2312/COMPAESTH. COMPAESTH10.009-016/009-016.pdf?sequence=1, pp. 8 (2010).
(Continued)

*Primary Examiner* — Xiao M Wu
*Assistant Examiner* — Scott E Sonners
(74) *Attorney, Agent, or Firm* — Freestone Intellectual Property Law PLLC

(57) ABSTRACT

In various examples, a visualization of an environment may be generated using a Panini projection that is optimized based on detected scene content. For example, image data of an environment may be perspective projected (e.g., using a rectilinear projection) to generate a reference projection image, which may be analyzed to detect the presence of vanishing points and/or horizontal lines (e.g., in a central region). The image data of the environment may be projected using a Panini projection that is optimized based on distances to detected objects, the absence of a detected vanishing point, and/or the presence of a detected horizontal line to generate a Panini projection image. In some embodiments, vertical compression is applied to the Panini projection image to correct for distortion of horizontal lines (e.g., based on the presence of a detected horizontal line).

20 Claims, 15 Drawing Sheets

(51) Int. Cl.
*G06T 7/536* (2017.01)
*G06T 15/20* (2011.01)

(58) Field of Classification Search
CPC ... G06T 2207/20132; G06T 7/12; G06T 7/11;
G06T 7/80; G06T 3/40; G06T 19/003;
G06T 3/12; G06T 3/073; G06T 3/047;
G06T 15/20; G06T 2207/20068; G06T
3/00; G06T 7/536
See application file for complete search history.

(56) References Cited

U.S. PATENT DOCUMENTS

2018/0075604 A1* 3/2018 Kim .......................... G09G 5/00
2021/0318444 A1* 10/2021 Li .......................... G01S 7/4034

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

RECTILINEAR HFOV = 120

FISHEYE IMAGE

220

210

200

IMAGE PLANE

315

320

345

X

310

330

θ

P₁ k kD

P₂

340

360

300

700

RECEIVE IMAGE DATA REPRESENTING AN ENVIRONMENT
B702

GENERATE A VISUALIZATION OF THE ENVIRONMENT BASED AT LEAST ON A PANINI PROJECTION OF THE IMAGE DATA USING ONE OR MORE PARAMETERS DETERMINED BASED AT LEAST ON DETECTED SCENE CONTENT
B704

800

RECEIVE IMAGE DATA REPRESENTING AN ENVIRONMENT
B802

GENERATE A VISUALIZATION OF THE ENVIRONMENT
BASED AT LEAST ON A RECTILINEAR PROJECTION OF A
CYLINDRICAL PROJECTION OF IMAGE DATA OF THE
ENVIRONMENT, AT THE LEAST ONE OF THE CYLINDRICAL
PROJECTION OR THE RECTILINEAR PROJECTION USING ONE
OR MORE PARAMETERS DETERMINED BASED AT LEAST ON
DETECTED SCENE CONTENT
B804

FIGURE 8

SERVER(S) 978

CPU 980(B)

CPU 980(A)

PCIe SWITCH 982(D)

PCIe SWITCH 982(C)

PCIe SWITCH 982(B)

PCIe SWITCH 982(A)

GPU 984(F)

GPU 984(H)

GPU 984(E)

GPU 984(G)

GPU 984(B)

GPU 984(D)

GPU 984(A)

GPU 984(C)

986

988

NETWORK(S) 990

992

994

900

976

1100

DISTORTION CORRECTION FOR ENVIRONMENT VISUALIZATIONS WITH WIDE ANGLE VIEWS

BACKGROUND

A panorama is an image or other visualization with a wide-angle view. Panoramas have applications in a variety of fields, such as photography, film, architecture, computer graphics, virtual and augmented reality, and three-dimensional (3D) modeling, to name a few examples.

One field in which panoramas may be useful is vehicle environment visualization. More and more vehicles, especially luxury brands or new models, are being equipped with vehicle environment visualization systems that provide occupants of a vehicle with a visualization of at least a portion of the area surrounding the vehicle. For drivers, vehicle environment visualization systems provide the driver with the ability to view the surrounding area, including blind spots where the driver's line of sight is occluded by parts of the vehicle or other objects in the environment, without the need to reposition (e.g., turn their head, get off the driver's seat, lean a certain direction, etc.). This visualization may assist and facilitate a variety of driving maneuvers, such as smoothly entering or exiting a parking spot without hitting vulnerable road users like pedestrians or objects such as a road curb or other vehicles.

Existing vehicle environment visualization systems often utilize fisheye cameras—typically mounted at the front, left, rear, and right sides of the vehicle body or rig—to perceive the surrounding area from multiple directions. Additional cameras may be included in special cases, like for long trucks or vehicles with trailers. An image or video feed from one or more of the cameras (e.g., pointing substantially in the direction in which the vehicle is traveling) may be presented on a display visible to the occupants of the vehicle. For example, if the vehicle is in reverse gear and/or moving in reverse, a video feed from a rear facing camera may be presented on the display to assist the driver in maneuvering the vehicle.

There are a variety of scenarios in which it may be useful or desirable for a panorama to use a particularly wide field of view. However, lenses with wide fields of view (e.g., 120 degrees or higher) typically introduce distortion, so images captured by such lenses often do not accurately reflect true object sizes and distances in the real world. Some conventional techniques seek to correct this distortion, but they have a variety of drawbacks. For example, one conventional technique seeks to undistort a fisheye image using a rectilinear projection of the fisheye image. However, using this technique to project images with wide angle fields of view as low as 120 degrees, the projected image is usually still distorted (e.g., stretched) at the boundaries of the field of view, and the distortion is typically worse for wider fields of view. Another technique projects a fisheye image using a Panini projection, which is a rectilinear projection of a cylindrical projection of an image. However, a Panini projection introduces distortion on horizontal lines in the image, so lines that should be represented as horizontal are often curved after a Panini projection. The horizontal line distortion is especially obvious for real-world horizontal lines that are represented in the center of the image. These visual artifacts negatively impact the visual quality of a panorama. In the context of vehicle environment visualization systems, visualizations of wide angle views of the surround environment often include visual artifacts that may obscure useful visual information and are often distracting to the driver and can interfere with the safe operation of the vehicle. As a result, there is a need for improved visualization techniques that reduce visual artifacts, better represent useful visual information in a vehicle environment visualization, and/or otherwise improve the visual quality of visualizations with wide angle views.

SUMMARY

Embodiments of the present disclosure relate to distortion correction for visualizations with a wide angle view. Systems and methods are disclosed that generate a visualization with a wide angle view using a cylindrical projection that uses an adaptive 3D cylinder that models the surrounding environment with a shape that changes dynamically based on distance to detected objects, using a rectilinear projection of the cylindrical projection from a view that depends on detected horizontal lines, and/or using horizontal line correction.

In contrast to conventional systems, such as those described above, a visualization of an environment may be generated using a Panini projection that is optimized based on detected scene content. For example, an image of an environment may be perspective projected (e.g., using a rectilinear projection) to generate a reference projection image, and the reference projection image may be analyzed to detect the presence of one or more vanishing points and/or horizontal lines (e.g., in a central region of the reference projection image). Additionally or alternatively, objects may be detected in the environment (e.g., in substantially the same direction in which the camera that captured the original image is pointing), and distances to the detected objects may be determined. As such, the image of the environment may be projected using a Panini projection that is optimized based on the distances to the detected objects, the absence of one or more detected vanishing points in the central region of the reference projection image, and/or the presence of a detected horizontal line in the central region of the reference projection image to generate a Panini projection image. In some embodiments, vertical compression is applied to the Panini projection image to correct for distortion of horizontal lines, for example, based on the presence of a detected horizontal line in the central region of the reference projection image. As such, distortion in a wide angle visualization may be corrected using an optimized Panini projection and/or vertical compression, enabling substantially wider panorama views with less distortion than prior techniques.

BRIEF DESCRIPTION OF THE DRAWINGS

The present systems and methods for distortion correction for visualizations with a wide angle view are described in detail below with reference to the attached drawing figures, wherein:

FIG. 8 is a flow diagram showing a method for generating a visualization of an environment based at least on a rectilinear projection of a cylindrical projection using one or more parameters determined based at least on detected scene content, in accordance with some embodiments of the present disclosure;

DETAILED DESCRIPTION

Figure 1:
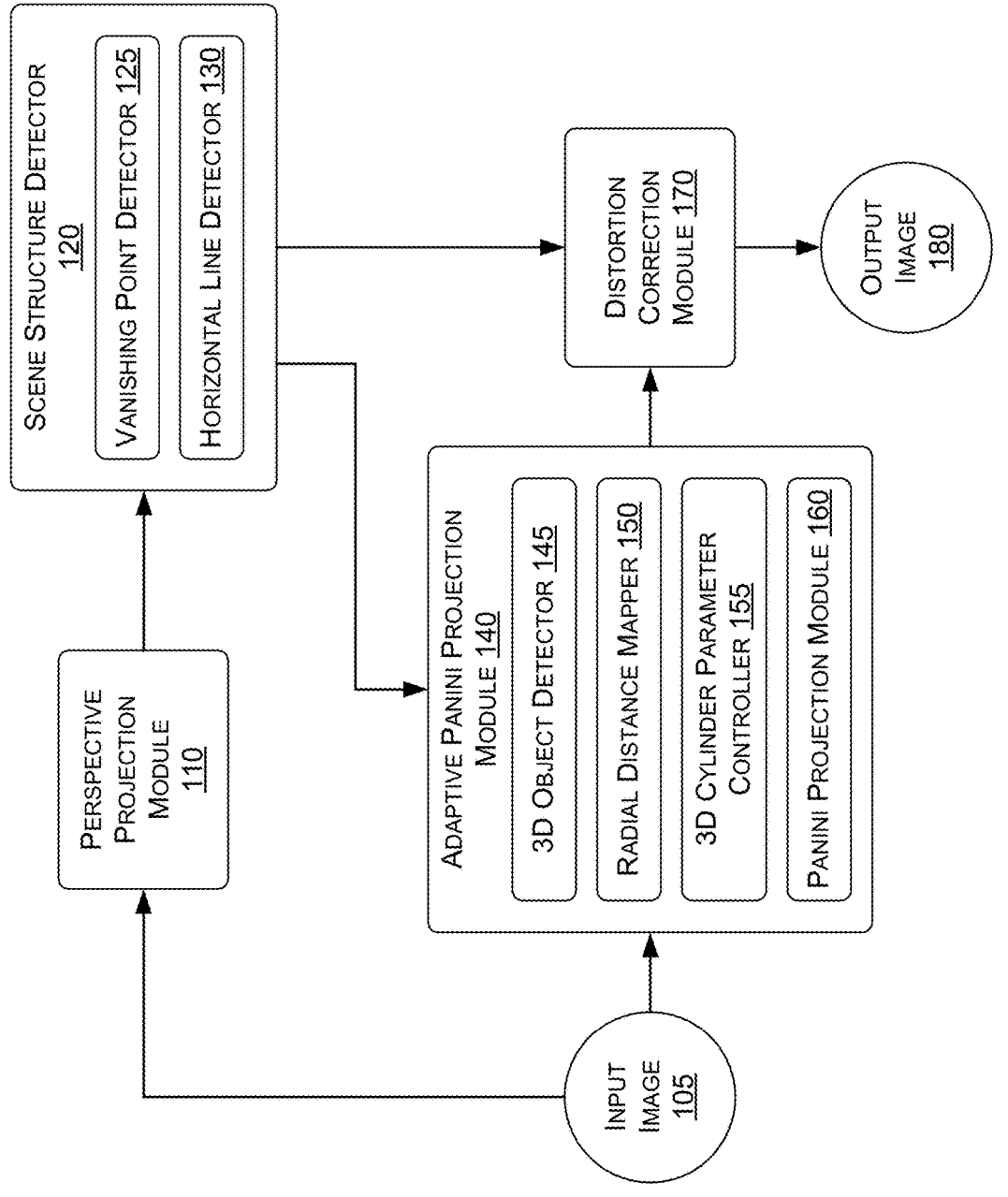
FIG. 1 is a data flow diagram illustrating a data flow through an example distortion correction system, in accordance with some embodiments of the present disclosure.

Systems and methods are disclosed relating to distortion correction for visualizations with wide angle views. For example, systems and methods are disclosed that generate a visualization with a wide angle view using a cylindrical projection that uses an adaptive 3D cylinder to model the surrounding environment. In one or more embodiments, the adaptive 3D cylinder may be represented with a shape that dynamically changes based on distance to detected objects, using a rectilinear projection of the cylindrical projection from a view that depends on detected horizontal lines, and/or using horizontal line correction. The present techniques may be utilized to generate a panorama with a wide field of view in systems for photography, simulation, film, architecture, computer graphics, virtual and augmented reality, 3D modeling, and/or others. Additionally or alternatively, the present techniques may be utilized to visualize at least a portion of an environment around an ego-object, such as a vehicle, robot, and/or other type of object, in systems such as parking visualization systems, vehicle environment visualization systems, remote piloting, visualization streaming systems, and/or others.

Although the present disclosure may be described with respect to an example autonomous or semi-autonomous vehicle or machine 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to vehicle environment visualizations, this is not intended to be limiting, and the systems and methods described herein may be used to provide a visualization in photography, film, architecture, computer graphics, augmented reality, virtual reality, mixed reality, 3D modeling, robotics, security and surveillance, autonomous or semi-autonomous machine applications, and/or any other technology spaces where panoramas or wide angle views may be used.

At a high level, one or more cameras (e.g., fisheye lens cameras) may be used to capture image data representing an environment. In an example embodiment involving a vehicle environment visualization system, one or more sensors (e.g., cameras) of an ego-object (e.g., a vehicle) may be used to detect sensor data (e.g., image data) representing an environment surrounding the ego-object. Generally, image data captured using a camera with a wide angle lens may manifest visual distortion—such as stretching or tearing—at the edge of the image. To correct this distortion, image data (e.g., a single image from a one camera, a stitched image from multiple cameras) may be perspective projected (e.g., using a rectilinear projection) to generate a reference projection image, and the reference projection image may be analyzed to detect the presence of one or more vanishing points and/or horizontal lines (e.g., in a central region of the reference projection image). Additionally or alternatively, objects may be detected in the environment (e.g., in substantially the same direction in which the camera that captured the original image is pointing), and distances to the detected objects may be determined. As such, the image data may be projected using a Panini projection that is optimized based on the distances to the detected objects, the absence of one or more detected vanishing points in the central region of the reference projection image, and/or the presence of a detected horizontal line in the central region of the reference projection image to generate a second projection image. In some embodiments, vertical compression is applied to the second projection image to correct for distortion of horizontal lines, for example, based on the presence of a detected horizontal line in the central region of the reference projection image. As such, distortion in a wide angle visualization may be corrected using an optimized Panini projection and/or vertical compression, enabling substantially wider panorama views with less distortion than prior techniques.

A Panini projection typically involves a cylindrical projection onto a 3D cylinder followed by a rectilinear projection of the cylindrical projection. In some embodiments, the 3D cylinder may adaptively model detected content of a scene to reduce distortion in an image. For example, in some embodiments, an environment (e.g., surrounding an ego-object) is visualized using an adaptive 3D cylinder that models the environment with a shape that changes based on distance (and direction) to detected objects. Distance (and direction) to detected objects may be determined using 3D object detection or a top-down 2D or 3D occupancy grid, and used to adapt the shape of the adaptive 3D cylinder, for example, by sizing its radius or diameter to fit within the distance to the closest detected object (e.g., a closest detected object in substantially the same direction in which the camera that captured the original image is pointing, a closest detected object of one or more designated classes). As such, image data may be projected onto a 3D cylinder that is fitted to scene content.

Additionally or alternatively, the rectilinear projection of the cylindrical projection may adapt to detected scene content to reduce distortion in an image. For example, horizontal line detection may be applied to detect the presence of a horizontal line (e.g., in the central region of a rectilinear projection of the image data), and a virtual camera used to generate the rectilinear projection of the cylindrical projection may be positioned based on whether or not a horizontal line was detected. For example, if there are no horizontal lines detected, the virtual camera may be placed relatively farther away from the center of the 3D cylinder (e.g., on or outside of the cylinder surface), which enables the resulting rectilinear projection to represent a relatively wider horizontal field of view with less likelihood of visible distortion. In some embodiments, if there is a horizontal line detected, the virtual camera may be placed relatively closer to the center of the 3D cylinder (e.g., inside the 3D cylinder), which should minimize or reduce distortion of the horizontal line introduced by the projection.

In some embodiments (e.g., if there is a horizontal line detected in the central region of a rectilinear projection of the image data), stretching introduced by a projection may be corrected by applying a compression in a corresponding direction. For example, a Panini projection may introduce distortion on horizontal lines such that lines that should appear to be horizontal in fact appear curved after the projection in a rendered image. In some such embodiments, vertical compression may be applied (e.g., to columns of pixels of the projection image, for columns of pixels representing image data within a particular viewing angle). A vertical compression function may be applied to each column (e.g., of a subset of columns) to map a source image (e.g., a Panini projection image) to a target image (e.g., a compressed image in which at least a portion of the distortion is corrected), for example, using a variable compression factor that is a function of the horizontal pixel (or column) location. In some embodiments, the resulting compressed image may include pixels with null values, so the compressed image may be cropped to omit those pixels.

As such, the techniques described herein may be used to generate panorama views with substantially wider fields of view and less distortion than prior techniques. For example, in some embodiments of a vehicle environment visualization system that includes one or more cameras, an image or video feed from one or more of the cameras (e.g., corresponding to the direction of travel) may be projected and/or compressed to generate a visualization that uses a wide horizontal field of view (e.g., 200 degrees) with substantially less distortion than in prior techniques. The visualization (e.g., a video feed from a rear facing camera) may be presented on a display visible to an occupant or operator of the vehicle (e.g., in-cabin, at a remote location) and may assist the operator in safely maneuvering the vehicle. As such, the techniques described herein may be used to generate improved visualizations that reduce visual artifacts, better represent useful visual information in a vehicle environment visualization, and promote safe operation of the vehicle. More generally, the techniques described herein may be used to generate improved visualizations that reduce visual artifacts, better represent useful visual information, and/or otherwise improve the visual quality of visualizations with wide angle views.

With reference to FIG. 1, FIG. 1 is a data flow diagram illustrating a data flow through an example distortion correction system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 900 of FIGS. 9A-9D, example computing device 1000 of FIG. 10, and/or example data center 1100 of FIG. 11.

At a high level, the distortion correction system 100 may receive an input image 105 or other image data (e.g., image data captured using a camera with a wide angle lens, a stitched image generated using multiple cameras with overlapping fields of view), and apply one or more processing operations on the input image 105 to generate an output image 180 with reduced visual distortion. For example, the input image 105 may be an image captured using a camera with a wide angle lens, such as a fisheye lens, and the output image 180 may be a panorama. In some embodiments, an input image 105 and corresponding output image 180 may be generated for each time slice (e.g., at a particular frame rate, such as 30 frames per second (fps)), and the output image 180 for each time slice may be generated based on a determination of whether or not to apply distortion correction (e.g., to a projection of the image), enabling distortion correction to be toggled on and off on a frame-by-frame basis.

In the embodiment illustrated in FIG. 1, the distortion correction system 100 includes a perspective projection module 110, a scene structure detector 120, an adaptive Panini projection module 140, and a distortion correction module 170. At a high level, since a Panini projection may introduce distortion in the central region of an image, a perspective (e.g., rectilinear) projection may be generated and used to estimate scene structure in the central region, and the estimated scene structure (and/or other detected scene content) may be used to optimize the Panini projection and/or determine whether to apply distortion correction to the projection image generated by the Panini projection. More specifically, the perspective projection module 110 may generate a reference projection image by projecting the input image 105 using a perspective (e.g., rectilinear) projection, and the scene structure detector 120 may apply vanishing point detection and/or horizontal line detection to detect one or more vanishing points and/or one or more horizontal lines in a central region of the reference projection image.

As such, one or more processing operations may be triggered to correct for distortion in the input image 105 based on detected scene content. For example, the adaptive Panini projection module 140 may apply a Panini projection (e.g., a rectilinear projection of a cylindrical projection of the input image 105) using one or more parameters determined based on detected scene content, such as distance and/or direction to detected objects in the environment and/or whether the scene structure detector 120 identified one or more vanishing points and/or one or more horizontal lines in a central region of the reference projection image. For example, the adaptive Panini projection module 140 may use a cylindrical projection that uses a three-dimensional (3D) cylinder that adaptively models the environment with a shape based at least on distance and/or direction to one or more detected objects in the environment. Additionally or alternatively, the adaptive Panini projection module 140 may use a rectilinear projection from the perspective of a virtual camera positioned based on whether the scene structure detector 120 identified one or more horizontal lines. In some embodiments, the distortion correction module 170 may determine to apply distortion correction to the projection image generated by the Panini projection module 140 (e.g., based on the scene structure detector 120 identifying one or more vanishing points and/or one or more horizontal lines in a central region of the reference projection image). As such, the output of the adaptive Panini projection module 140 or output of the distortion correction module 170 may be used as the output image 180.

Depending on the embodiment, the input image 105 may be generated in various ways. For example, the input image 105 may be captured using a handheld camera, a security camera, a camera mounted to an ego-object, such as the autonomous vehicle 900 of FIGS. 9A-9D, and/or otherwise. In some embodiments, image data captured using multiple cameras with overlapping fields of view may be stitched together to form a stitched image, and the stitched image may be used as the input image 105. In an example embodiment in which the input image 105 is generated using one or more cameras of an ego-object, the one or more cameras may include stereo camera(s) 968, wide-view camera(s) 970 (e.g., fisheye cameras), infrared camera(s) 972, surround camera(s) 974 (e.g., 360° cameras), and/or long-range and/or mid-range camera(s) degree 998 of the autonomous vehicle 900 of FIGS. 9A-9D.

Figure 2:
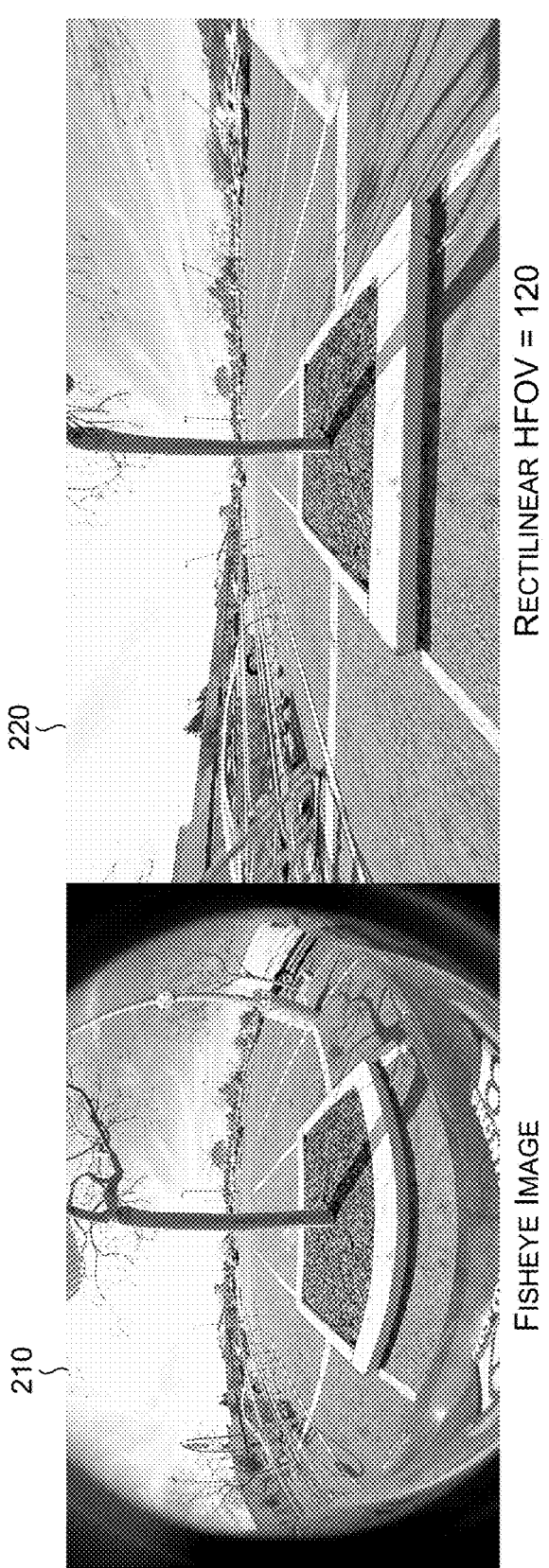
FIG. 2 illustrates an example fisheye image and rectilinear projection of the fisheye image, in accordance with some embodiments of the present disclosure.

In some implementations that include a perspective projection module 110, the perspective projection module 110 generates a reference projection image using any suitable projection of the input image 105, such as a rectilinear projection. FIG. 2 illustrates an example fisheye image 210 and a rectilinear projection 220 of the fisheye image 210, in accordance with some embodiments of the present disclosure. A rectilinear projection has the advantage that it typically represents straight lines in the central region of the input image 105 as substantially straight lines in the central region of the reference projection image, so it may be easier or more efficient for the scene structure detector 120 to detect certain scene content (e.g., vanishing points, horizontal lines) from a rectilinear projection image (e.g., relative to a fisheye image or a Panini projection image). However, some embodiments may involve the scene structure detector 120 evaluating some other image data (e.g., the input image 105, Panini projection image) in addition or alternatively to evaluating a rectilinear projection image.

In the embodiment illustrated in FIG. 1, the scene structure detector 120 includes a vanishing point detector 125 and a horizontal line detector 130. In embodiments that include the vanishing point detector 125, the vanishing point detector 125 may apply vanishing point detection to determine whether the reference projection image includes one or more vanishing points (e.g., in a central region). In embodiments that include the horizontal line detector 130, the horizontal line detector 130 may apply line detection to determine whether the reference projection image includes one or more substantially horizontal lines (e.g., in a central region).

More specifically, the vanishing point detector 125 may effectively distinguish different types of scenes by detecting whether the reference projection image (and/or some other representation of the environment) includes one or more vanishing points. Any known vanishing point detection technique may be applied. For example, the vanishing point detector 125 may detect lines (e.g., long street lines) using any known line detection algorithm (e.g., a Hough Transform), group the detected lines, identify intersections of the detected lines, identify clusters of line intersections, and identify one or more of the clusters with the highest concentrations of line intersections, where each identified cluster may be interpreted as a detected vanishing point. Additionally or alternatively, the vanishing point detector 125 may use a machine learning model such as a neural network to detect vanishing points. For example, neural network may accept an input image and predict a corresponding probability map where each pixel represents a likelihood that the pixel is part of a vanishing point. The neural network may be trained (or updated) using ground truth images annotated with vanishing point locations (e.g., setting a value such as 1 for each pixel or group of pixels that is part of a vanishing point, setting some other value such as 0 for each of the other pixels, dilating the region representing each ground truth vanishing point).

In some embodiments, the vanishing point detector 125 applies vanishing point detection to detect zero or more vanishing points in an image, and if any vanishing points are detected, determines whether a vanishing point has been detected in a particular region of the image, such as a central region. For example, a circle may be centered in the center of the image and defined with some radius (e.g., so the area of the circle amounts to some percentage of the image, such as 50%), and the vanishing point detector 125 may determine whether a vanishing point has been detected in the circle. As explained in more detail below, in some embodiments, the vanishing point detector 125 may communicate a signal representing the presence or absence of such a vanishing point (e.g., in the central region of the reference projection image) to the adaptive Panini projection module 140 and/or the distortion correction module 170, which may use the signal as an indication that the distortion correction module 170 should (e.g., no vanishing point(s) are detected in a central region) apply distortion correction, or should not (e.g., one or more vanishing point(s) are detected in a central region) apply distortion correction (e.g., the projection image generated by the adaptive Panini projection module 140 should be used as the output image 180).

In some embodiments, the horizontal line detector 130 determines whether the reference projection image (and/or some other representation of the environment) includes one or more horizontal lines. The horizontal line detector 130 may apply any known line detection algorithm (e.g., Hough transform), and/or retrieve results of a previously executed line detection algorithm (e.g., run or triggered by the vanishing point detector 125). To determine whether any detected lines are horizontal, the horizontal line detector 130 may evaluate some or all detected lines (e.g., detected lines within a central region of the image, such as those at least partially inside a circle with a designated radius and centered at the center of the image), determine the angle of inclination for any given detected line, and determine whether the angle of inclination is within some threshold (e.g., plus or minus 10 or 20 degrees of horizontal). As explained in more detail below, in some embodiments, the horizontal line detector 130 may communicate a signal representing the absence of such a substantially horizontal line to the adaptive Panini projection module 140, which may use the signal in determining where to place a virtual camera for a rectilinear projection of the Panini projection. Additionally or alternatively, the horizontal line detector 130 may communicate such a signal to the adaptive Panini projection module 140 and/or the distortion correction module 170, which may use the signal as an indication that the distortion correction module 170 should (e.g., horizontal line detected in a central region) apply distortion correction, or should not (e.g., no horizontal line(s) detected in a central region) apply distortion correction (e.g., the projection image generated by the adaptive Panini projection module 140 should be used as the output image 180).

In some embodiments, the adaptive Panini projection module 140 generates a Panini projection image by projecting the input image 105 using a Panini projection that is optimized to (e.g., uses one or more parameters that are based on) detected scene content, for example, based on distances to one or more detected objects, based on the absence of a detected vanishing point (e.g., in the central region of the reference projection image), and/or based on the presence of a detected horizontal line (e.g., in the central region of the reference projection image). In the embodiment illustrated in FIG. 1, the adaptive Panini projection module 140 includes a 3D object detector 145, a radial distance mapper 150, a 3D cylinder parameter controller 155, and a Panini projection module 160.

At a high level, one or more sensors (e.g., cameras) of an ego-object (e.g., a vehicle) may be used to capture the input image 105 and/or other sensor data. The 3D object detector 145 may perform 3D object detection on the sensor data (e.g., the input image 105, corresponding RADAR or LiDAR data) representing the surrounding environment. In some embodiments, sensor data such as a LiDAR or RADAR point cloud may be projected onto a top-down 2D or 3D occupancy grid that represents locations of detected objects. A radial distance mapper 150 may compute distance(s) to the closest detected object (e.g., in a particular direction, such as a direction corresponding to some or all of the field of view of the camera(s) used to generate the input image 105) as a function of angle (e.g., representing a rotation around an axis of the coordinate system of the ego-object, such as yaw). A 3D cylinder parameter controller 155 may use the distances and directions to adapt the shape of a 3D cylinder (e.g., a mesh or other geometric model). The shape of the 3D cylinder may be adapted, for example, by (re)sizing the radius, diameter, or some other parameter of the 3D cylinder so the 3D cylinder fits within the distance to the closest detected object (e.g., so that the depth of the closest object can be best represented via the cylinder). As such, the Panini projection module 160 may generate and use a 3D cylinder with a shape that adapts to detected scene content for a Panini projection (a rectilinear projection of a cylindrical projection) of the input image 105.

Generally, distances and directions to surrounding objects may be obtained or determined in various ways. In the example illustrated in FIG. 1, the 3D object detector 145 performs any known technique to identify 3D points that belong to surrounding objects (or objects in a particular area of the surrounding environment), and the radial distance mapper 150 calculates distances and directions to the 3D points. The 3D object detector 145 may include or trigger one or more machine learning models (e.g., neural networks) to predict 3D cuboids from the input image 105, corresponding LiDAR or RADAR detections, and/or other sensor data, and distances and directions between the ego-object (e.g., vehicle center, camera center) to detected objects (e.g., closest point, 3D cuboids corner(s), center) may be computed from the predicted 3D cuboids. In some embodiments, the 3D object detector 145 uses one or more machine learning models (e.g., neural networks) to predict (e.g., top down) 2D bounding boxes, for example, from an orthographic projection of image data (e.g., fisheye images), LiDAR or RADAR detections, and/or other sensor data, and distances and directions between the ego-object and detected objects (e.g., closest point, bounding box corner(s), center) may be computed from the predicted 2D bounding boxes.

In another example technique for determining distances to objects in the environment, sensor data such as a LiDAR or RADAR point cloud representing detected objects may be projected into a 2D or 3D top-down occupancy grid, and distances to the closest LiDAR or RADAR point in the 2D or 3D top-down occupancy grid may be computed. In some embodiments, some other depth ranging technique may be additionally or alternatively applied, for example, using depth or stereo camera arrays, sensor data, and/or a machine learning model (e.g., a neural network) to generate or predict depth values, a depth map, range ranges, or a range image (e.g., a LiDAR range image); and distances to objects in the environment may be determined from corresponding depth or range values.

Regardless of how the surrounding detected objects are represented (e.g., detected 3D objects, occupied cells in a 2D or 3D occupancy grid), in some embodiments, detected objects beyond some threshold distance to the ego-object (e.g., 3 m, 7 m, 15 m, etc.) may be filtered out or ignored to free up computational resources and/or to reduce distortion resulting from a wider range of detected objects. In some embodiments, the range threshold used during range filtering may be variable, for example, based on the distance to the closest detected objects. An example implementation might start with an initial range threshold (e.g., 5 m), and expand to a farther range threshold (e.g., 7 m) based on no detected objects being within the initial range threshold, or reduce to a closer range threshold (e.g., 3 m) based on detected objects being within the initial range. As such, some embodiments may serve to identify one or more closest detected objects within a variable range threshold. In some cases, detected objects outside the applicable range threshold may be filtered out or otherwise ignored from consideration.

As such, the radial distance mapper 150 may compute distances and directions to the (remaining) object detections using any of the techniques described herein, and a representation of the distances and directions may be generated. In some embodiments, the distances and directions are represented in a radial distance map, list of entries, or some other structure that represents distance to the closest detected object and direction (e.g., distance as a function of an angle, such as yaw). For example, the representation of the distances and directions may take the form of a 2D array with a radial component (e.g., identifying an angular increment, such as 1 degree) and one or more distance components (representing the distance to the closest detected object in the direction represented by a corresponding angular increment, representing the distance to a particular corner or center of the closest detected object in that direction).

Based on the distances and directions between the ego-object and the detected objects, the 3D cylinder parameter controller 155 may adapt the shape of a 3D cylinder modeling the surrounding environment based on the distances and directions to the detected objects. As explained in more detail below, the 3D cylinder may be oriented in an upright position, centered around the camera that captured the input image 105 in any suitable coordinate system, centered at the origin of a rig coordinate system for a rig on which the camera is attached, and/or otherwise. As such, the distances and/or directions to the detected objects may be used to fit 3D cylinder. For example, the 3D cylinder parameter controller 155 may determine the distance to the closest detected object, the distance to the closest detected object in a particular region of the environment (e.g., within the field of view represented by the input image 105), the distance to the closest detected object of one or more designated classes (e.g., prioritizing certain classifications of detected object), and/or otherwise. Based on that distance, the 3D cylinder parameter controller 155 may adapt the shape of a 3D cylinder, for example, by setting a corresponding parameter of the 3D cylinder to (re)size the 3D cylinder to fit within the distance to the closest detected object (e.g., setting the radius of the cylinder to correspond to the distance to the closest detected object). As such, the Panini projection module 160 may use the 3D cylinder in a Panini projection of the input image 105.

Figure 3A:
FIGS. 3A-3B illustrate an example Panini projection, in accordance with some embodiments of the present disclosure.
Figure 3B:
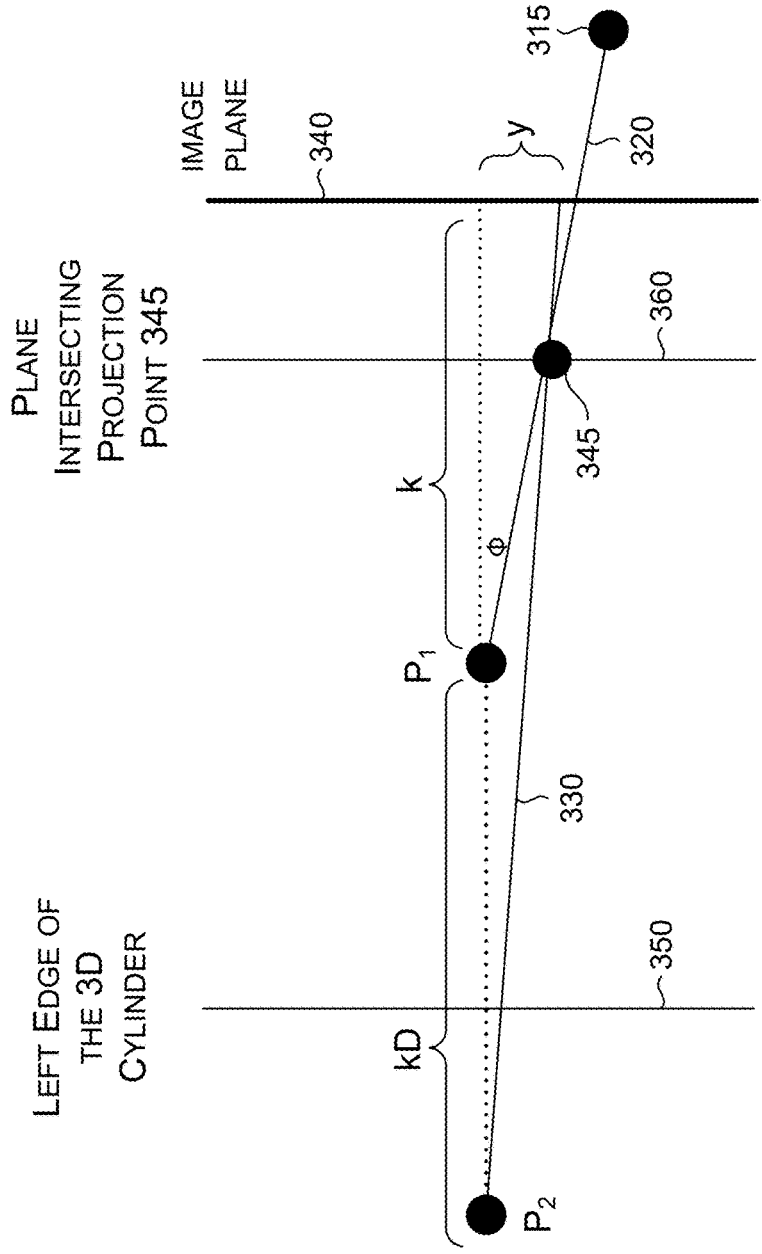

FIGS. 3A-3B illustrate an example Panini projection, in accordance with some embodiments of the present disclosure. FIG. 3A illustrates a top down view of a 3D cylinder 310 centered at a 3D point $P_1$ (e.g., the center of the camera used to generate the input image 105 of FIG. 1, the origin of a rig coordinate system, etc.). Taking an example 3D point 315 represented in an image (e.g., the input image 105 of FIG. 1), the adaptive Panini projection module 160 may project the 3D point 315 from the center of the 3D cylinder ($P_1$) onto the edge of the 3D cylinder 310 (projection point 345). This projection is represented by the line 320. FIG. 3B illustrates a side view of the 3D cylinder 310 centered at $P_1$ and in an upright position with its left edge represented by a plane 350 and its right edge coinciding with the image plane 340. As such, FIG. 3B illustrates a second view of the projection (e.g., the line 320) from the center of the 3D cylinder ($P_1$) onto the edge of the 3D cylinder 310 (projection point 345. A plane 360 that intersects the projection point 345 is shown in both FIGS. 3A and 3B for illustration purposes.

As illustrated in both FIGS. 3A and 3B, a Panini projection may be generated by positioning a virtual camera at the 3D point $P_2$ and projecting the projection point 345 onto the image plane 340. This projection is represented by the line 330. The projection 320 may be understood a cylindrical projection since it projects the 3D point 315 onto the 3D cylinder 310, and the projection 330 may be understood as a rectilinear projection since it projects the projection point 345 onto the image plane 340. Note that the projection 320 may also be understood as a rectilinear projection since it depends on the view from the actual camera located at point $P_1$, and the projection 330 may be also be understood as a cylindrical projection since it projects through the 3D cylinder 310.

The parameter k represents the focal length, and the parameter D is a scaling factor that controls the distance between the virtual camera at point $P_2$ to the image plane 340. Based on triangle similarity:

$$x/(k + kD) = k\sin(\text{theta})/(k\cos(\text{theta}) + kD) \qquad \text{(Eq. 1)}$$

$$x/k = \sin(\text{theta})(1 + D)/(\cos(\text{theta}) + D) \qquad \text{(Eq. 2)}$$

Note, when D=0, the virtual camera position $P_2$ moves to the center of the 3D cylinder at $P_1$, and the Panini projection becomes a rectilinear projection. For a given image, the focal length k of the image may be computed from the field of view and image width using known techniques. The larger D becomes, the more compressed the horizontal view represented in the Panini projection image becomes, and the more curved any central horizontal lines become. As such, a value of D may be selected to control the degree to which the horizontal field of view gets compressed.

Accordingly, values of D may be selected (e.g., by the Panini projection module 160 of FIG. 1) based on whether there are any horizontal lines detected (e.g., by horizontal line detector 130 of FIG. 1). For example, if there are no horizontal lines detected, the virtual camera may be placed relatively farther away from the center of the 3D cylinder (e.g., on or outside of the cylinder surface, for example, 1<D<5, optionally using smaller values for D for wider image or screen widths and vice versa), which enables the resulting rectilinear projection to represent a relatively wider horizontal field of view with less likelihood of visible distortion. In some embodiments, if there is a horizontal line detected, the virtual camera may be placed relatively closer to the center of the 3D cylinder (e.g., inside the 3D cylinder, for example, 0.5<D<1), which should minimize or reduce distortion of the horizontal line introduced by the projection.

Returning to FIG. 1, the distortion correction module 170 may apply vertical compression to correct distortion of horizontal lines introduced by the Panini projection module 160. In some embodiments, a determination of whether or not to apply vertical compression may be made based on whether the scene structure detector 120 detects a vanishing point and/or a substantially horizontal line (e.g., in the central region of the reference projection image). In some embodiments, the distortion correction module 170 applies vertical compression based on a determination that one or more vanishing points and/or one or more horizontal lines have been detected. For example, if there are one or more central vanishing points or no central horizontal lines, a determination not to apply vertical compression may be made (e.g., since visual distortion is less likely to be noticeable in that scenario).

Figure 4:
FIG. 4 illustrates an example vertical compression technique, in accordance with some embodiments of the present disclosure.

In some embodiments in which vertical compression is applied, the distortion correction module 170 identifies a reference line in the Panini projection image (e.g., a curved or stretched line to be compressed), and compresses the Panini projection image to reduce distortion of the reference line. For example, the distortion correction module 170 may identify a substantially horizontal line that was detected from (e.g., a central region of) the reference projection image (e.g., by the horizontal line detector 130), and identify a corresponding line in the Panini projection image using feature matching (e.g., using a scale-invariant feature transform). Since the Panini projection may introduce distortion of horizontal lines, a substantially horizontal line in the reference projection image may correspond to a curved in the Panini projection image. For example, FIG. 4 illustrates an example Panini projection image (denoted as a source image 410) that includes a curved line 420 that would correspond to a detected horizontal line in a rectilinear projection image (e.g., the rectilinear projection 220 of the fisheye image 210 of FIG. 2), represented in FIG. 4 as a straight line 430.

Returning to FIG. 1, the distortion correction module 170 may apply vertical compression to columns of pixels of the Panini projection image, such as columns of pixels representing image data within a particular viewing angle. For example, a subset of the columns of the Panini projection image within some angle of the center of the image may be designated (e.g., fixed by design, variable), and the distortion correction module 170 may apply a compression function to those columns. In some embodiments, the length, horizontal extent, column coverage, and/or some other characteristic of the identified curved line in the Panini projection image (e.g., the curved line 420 of FIG. 4) and/or the corresponding straight reference line (e.g., the straight line 430 of FIG. 4) may be used to define the subset of the columns of the Panini projection image that are subject to compression. For example, upon identifying a curved line in the Panini projection image to be corrected and/or a corresponding reference straight line, the distortion correction module 170 may determine the subset of columns within which the identified curved line and/or the reference line fall, and apply a compression function to those columns to match the curved line to the straight line.

For example, the distortion correction module 170 may generate a compressed image (e.g., the target image 450 of FIG. 4) by iterating through the identified columns in a Panini projection image (e.g., the columns 480 of the source image 410 of FIG. 4) and for each column, using a compression function to map each pixel of the source image to a corresponding pixel of the target image (or vice versa). Using FIG. 4 as an example, in some embodiments, the distortion correction module 170 may initialize some or all of the target image 450, setting values for pixels outside of the columns being compressed (e.g., columns 470a and 470b) to match the values of corresponding pixels of the source image 410. For each column subject to compression (e.g., each of the columns 480), the distortion correction module 170 may iterate through the columns, and for each column, iterate through the pixels in the column (e.g., from top to bottom), mapping pixels of one image to corresponding pixels in the other image.

Taking an example embodiment that maps pixels of the source image 410 to corresponding (compressed) pixels of the target image 450, the distortion correction module 170 may use a compression function that maps the height of a source pixel to a corresponding height for a corresponding target pixel (or vice versa). Taking an example representation of pixel height spanning a value of zero at the top of the image to a height of H at the bottom of the image, a vertical compression function may be defined so pixels in the vertical center of the image remain in the same location (equation 3, below), and the bottom row of the source image (h=H) is mapped to some compressed height c*H in the target image (equation 4, below). In an example embodiment:

$$h_{source}|_{h=H/2} = h_{target}|_{h=H/2} \qquad \text{(Eq. 3)}$$

$$h_{source}|_{h=H} = h_{target}|_{h=c*H,\,0.5<c<=1} \qquad \text{(Eq. 4)}$$

where $h_{source}$ is the height of source pixel, $h_{target}$ is the compressed height of corresponding target pixel, and c is a compression factor that controls the amount of compression.

Using this example scenario, a vertical compression function such as the following may be defined:

$$h_{source} = a*h_{target} + b \qquad \text{(Eq. 5)}$$

$$a = 1/(2c - 1) \qquad \text{(Eq. 6)}$$

$$b = H*(1 - a)/2 \qquad \text{(Eq. 7)}$$

In some embodiments, the compression function may use a variable compression factor c that depends on the horizontal position (e.g., an x coordinate) of the column being compressed. In an example embodiment, the distortion correction module 170 may model the compression factor as a function of the x coordinate of the column being compressed using a polynomial function, such as:

$$c = a(x - x_{curve\,mid})^2 + b \qquad \text{(Eq. 8)}$$

Values for the polynomial coefficients a and b may be calculated, for example, by defining a midpoint for the compression factor (e.g., at the midpoint of the identified curve) and assigning a value that compresses the identified curve to match the reference straight line in that column. In some embodiments, four equalities may be defined for three control points, and the equalities may be solved for three variables a, b, and c. For example, the compression factor may be defined so there is no compression (e.g., c=1) for the left and right end points of the identified curve, and in the middle of the curve, the compression factor may be defined based on the difference between the height of the curved lined and the height of the reference straight line. In an example embodiment:

$$1 = a(x_{curve\,start} - x_{curve\,mid})^2 + b \qquad \text{(Eq. 9)}$$

$$1 = a(x_{curve\,end} - x_{curve\,mid})^2 + b \qquad \text{(Eq. 10)}$$

$$c_{mid} = a(x_{curve\,mid} - x_{curve\,mid})^2 + b \qquad \text{(Eq. 11)}$$

$$c_{mid} = 1 - \text{abs}(y_{curve\,mid} - y_{line\,height})/H \qquad \text{(Eq. 12)}$$

where $x_{curve\,start}$, $x_{curve\,mid}$, and $x_{curve\,end}$ are the x coordinates of the left end point, midpoint, and right end point of the identified curve, $y_{curve\,mid}$ is the y coordinate of the midpoint of the identified curve, and $y_{line\,height}$ is the y coordinate of the reference straight line in a particular column. In an example embodiment, the distortion correction module 170 may solve equation 12 for $c_{mid}$ at the midpoint of the identified curve, and then use the value of $c_{mid}$ and its relationship to a and b (e.g., represented in equations 9, 10, and/or 11) to compute values for a and b. For example, equations 9 and 11 may be solved for a and b as follows:

$$a = (1 - c_{mid})/(x_{curve\,start} - x_{curve\,mid})^2 \qquad \text{(Eq. 13)}$$

$$b = c_{mid} \qquad \text{(Eq. 14)}$$

As such, the values of a and b may be used in equation 8 to compute a value for c at any particular column, and the values of a and b and c may be used in equation 5 to map pixels of the target image to corresponding pixels of the source image (or vice versa).

In some embodiments, and with respect to FIG. 4, compressing the columns 480 of the source image 410 results in a target image 450 that includes some pixels with null values (e.g., regions 460). As such, and returning to FIG. 1, in some embodiments, the distortion correction module 170 may crop the target image 450 to omit the rows that include pixels with null values.

Figure 5:
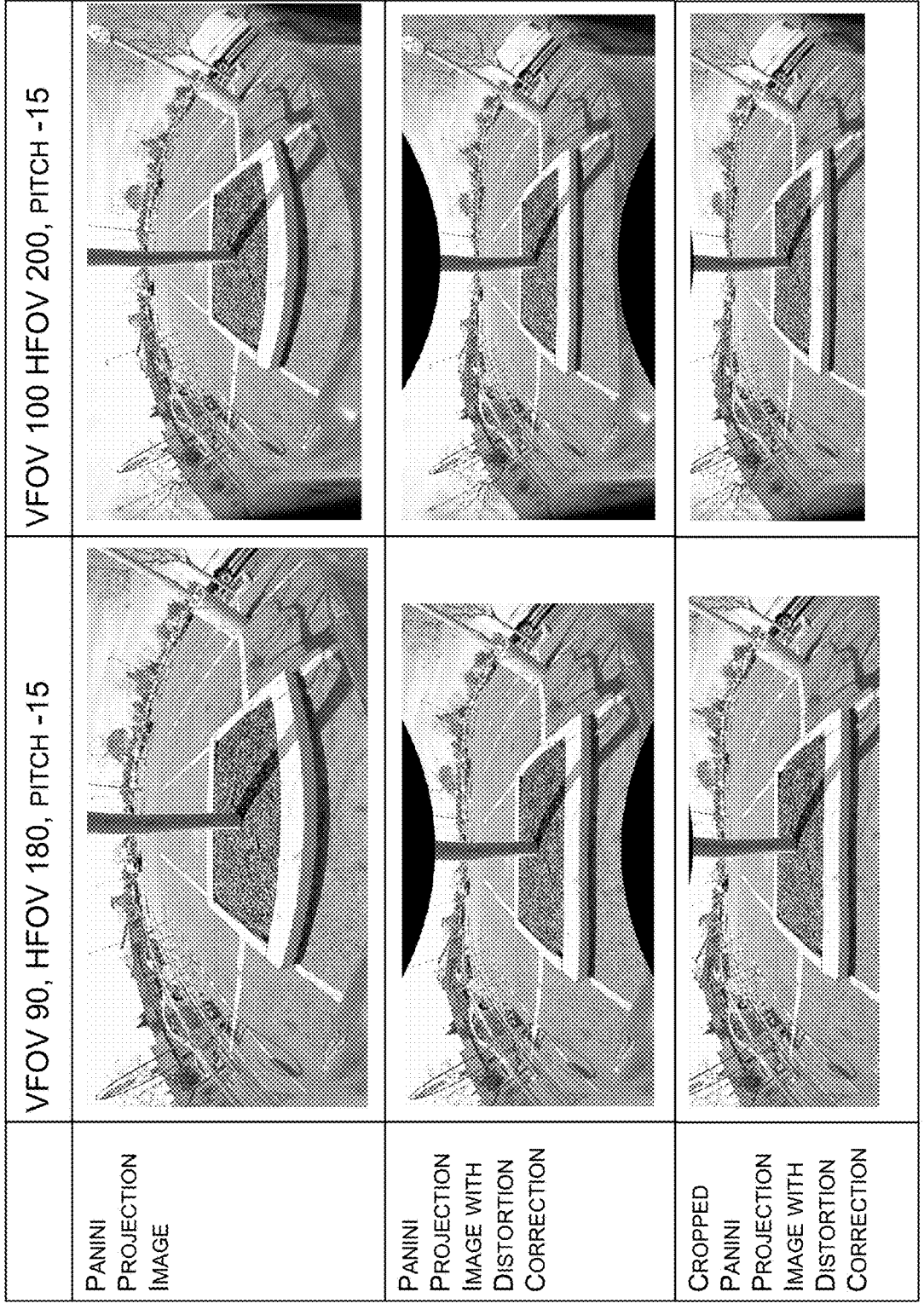
FIG. 5 illustrates example visualizations generated using a Panini projection, a Panini projection with distortion correction, and a cropped Panini projection with distortion correction, in accordance with some embodiments of the present disclosure.

FIG. 5 illustrates example visualizations generated using a Panini projection, a Panini projection with distortion correction, and a cropped Panini projection with distortion correction, in accordance with some embodiments of the present disclosure. In FIG. 5, the left column of visualizations represents a 90 degree vertical field of view and a 180 degree horizontal field of view, and the right column of visualizations represents a 100 degree vertical field of view and a 200 degree horizontal field of view. The Panini projection images represent visualizations that may be generated using a conventional Panini projection. Those images include some stretching in the central region of the images, so horizontal lines appear curved. The Panini projection images with distortion correction represent visualizations that may be generated using the adaptive Panini projection module 140 and/or the distortion correction module 170 of FIG. 1. As illustrated, the distortion of the horizontal stretching has been corrected in these images. Finally, the cropped Panini projection images with distortion correction represent example visualizations in which the distortion correction module 170 of FIG. 1 crops out the null pixels from visualizations in the preceding row.

Figure 6:
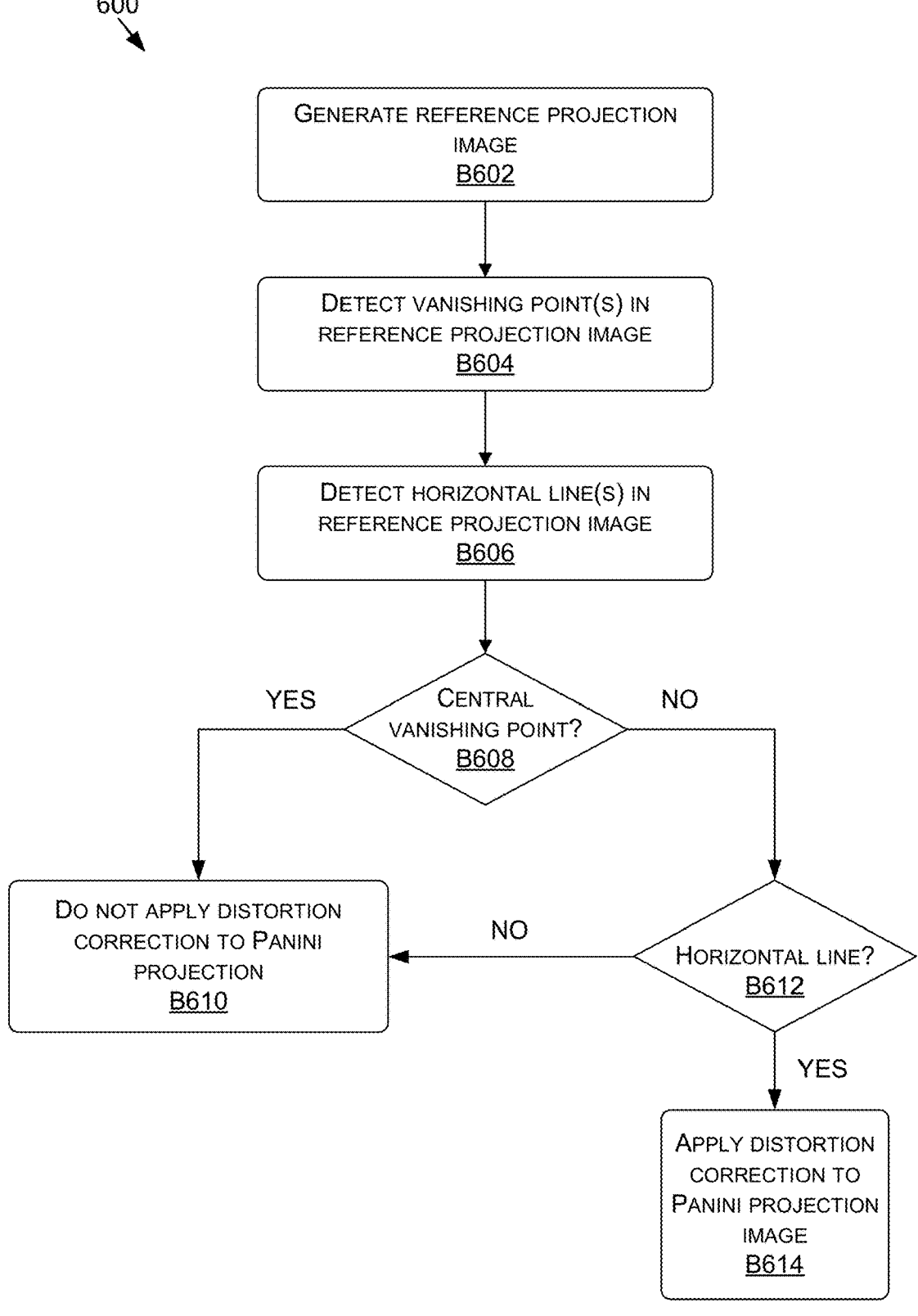
FIG. 6 is a flow diagram showing a method for toggling distortion correction based on vanishing point and horizontal line detection, in accordance with some embodiments of the present disclosure.
Figure 7:
FIG. 7 is a flow diagram showing a method for generating a visualization of an environment based at least on a Panini projection using one or more parameters determined based at least on detected scene content, in accordance with some embodiments of the present disclosure.

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 600, 700, and 800 are described, by way of example, with respect to the distortion correction system 100 of FIG. 1. However, these methods may additionally or alternatively be executed by any one system, or any combination of systems, including, but not limited to, those described herein.

FIG. 6 is a flow diagram showing a method 600 for toggling distortion correction based on vanishing point and horizontal line detection, in accordance with some embodiments of the present disclosure. For example, image data may be generated for each time slice (e.g., at a particular frame rate, such as 30 frames per second (fps)), and a determination of whether or not to apply distortion correction (e.g., to a projection of the image) for each time slice may be made using the method 600, enabling distortion correction to be toggled on and off on a frame-by-frame basis.

The method 600, at block B602, includes generating a reference projection image. For example, with respect to FIG. 1, the perspective projection module 110 may generate a reference projection image by projecting the input image 105 using a perspective (e.g., rectilinear) projection.

The method 600, at block B604, includes detecting one or more vanishing points in the reference projection image. For example, with respect to FIG. 1, the scene structure detector 120 may apply vanishing point detection to detect one or more vanishing points in a central region of the reference projection image (e.g., a circle with a designated radius centered in the center of the image).

The method at block B606, includes detecting one or more substantially horizontal lines (e.g., in a central region) in the reference projection image. For example, with respect to FIG. 1, the horizontal line detector 130 may use any known line detection algorithm to identify lines in the reference projection image, evaluate some or all of the detected lines (e.g., detected lines within a central region of the image, such as those at least partially inside a circle with a designated radius and centered at the center of the image), determine the angle of inclination for any given detected line, and determine whether the angle of inclination is within some threshold (e.g., plus or minus 10 or 20 degrees of horizontal).

The method 600, at decision block B608, determines whether a vanishing point has been detected in (e.g., a particular region of) the reference projection image. If a central vanishing point is detected in (e.g., the central region of) the reference projection image, the method 600 advances to block B610, which includes determining not to apply distortion correction to a Panini projection image. For example, with respect to FIG. 1, the vanishing point detector 125 may communicate a signal representing a vanishing point was detected (e.g., in the central region of the reference projection image) to the adaptive Panini projection module 140 and/or the distortion correction module 170, which may use the signal as an indication that the distortion correction module 170 should not apply distortion correction (e.g., the projection image generated by the adaptive Panini projection module 140 should be used as the output image 180). Although decision block B608 is illustrated after block B606 in this embodiment, in some embodiments, the decision may occur at some other location, such as after block B604.

If no vanishing point is detected (e.g., in the central region of) the reference projection image, the method 600 advances to decision block B612, which includes determining whether one or more substantially horizontal lines were detected (e.g., in a central region) in the reference projection image at block B606. If not, the method 600 advances to block B610, which includes determining not to apply distortion correction to a Panini projection image. For example, with respect to FIG. 1, the horizontal line detector 130 may communicate a signal representing the absence of a detected horizontal line to the adaptive Panini projection module 140 and/or the distortion correction module 170, which may use the signal as an indication that the distortion correction module 170 should not apply distortion correction (e.g., the projection image generated by the adaptive Panini projection module 140 should be used as the output image 180).

If a substantially horizontal line is detected in (e.g., the central region of) the reference projection image, the method 600 advances to block B614, which includes applying distortion correction to a Panini projection. For example, with respect to FIG. 1, the horizontal line detector 130 may communicate a signal representing the presence of a detected horizontal line to the adaptive Panini projection module 140 and/or the distortion correction module 170, which may use the signal as an indication that the distortion correction module 170 should apply distortion correction. As such, the distortion correction module 170 may apply vertical compression to correct distortion of horizontal lines introduced by the Panini projection module 160. Although decision block B612 is illustrated after block B608 in this embodiment, in some embodiments, the decision may occur at some other location, such as after block B606.

FIG. 7 is a flow diagram showing a method 700 for generating a visualization of an environment based at least on a Panini projection using one or more parameters determined based at least on detected scene content, in accordance with some embodiments of the present disclosure. The method 700, at block B702, includes receiving image data representing an environment. For example, with respect to FIG. 1, the distortion correction system 100 may receive an input image 105 or other image data, such as image data captured using a camera with a wide angle lens, a stitched image generated using multiple cameras with overlapping fields of view, and/or other examples.

The method 700, at block B704, includes generating a visualization of the environment based at least on a Panini projection of the image data using one or more parameters determined based at least on detected scene content. For example, with respect to FIG. 1, the adaptive Panini projection module 140 may apply a Panini projection (e.g., a rectilinear projection of a cylindrical projection of the input image 105) using one or more parameters determined based on detected scene content, such as distance and/or direction to detected objects in the environment and/or whether the scene structure detector 120 identified one or more vanishing points and/or one or more horizontal lines in a central region of the reference projection image. Note that detected scene content may, but need not, be detected using the input image 105 that represents the image data being projected in the Panini projection (e.g., object detection may additionally or alternatively be applied using some other sensor data, such as RADAR or LiDAR data).

FIG. 8 is a flow diagram showing a method 800 for generating a visualization of an environment based at least on a rectilinear projection of a cylindrical projection using one or more parameters determined based at least on detected scene content, in accordance with some embodiments of the present disclosure. The method 800, at block B802, includes receiving image data representing an environment. For example, with respect to FIG. 1, the distortion correction system 100 may receive an input image 105 or other image data, such as image data captured using a camera with a wide angle lens, a stitched image generated using multiple cameras with overlapping fields of view, and/or other examples.

The method 800, at block B804, includes generating a visualization of the environment based at least on a rectilinear projection of a cylindrical projection of image data of the environment, at the least one of the cylindrical projection or the rectilinear projection using one or more parameters determined based at least on detected scene content. For example, with respect to FIG. 1, the adaptive Panini projection module 140 may apply a rectilinear projection of a cylindrical projection of the input image 105 using one or more parameters determined based on detected scene content, such as distance and/or direction to detected objects in the environment and/or whether the scene structure detector 120 identified one or more vanishing points and/or one or more horizontal lines in a central region of the reference projection image. Note that detected scene content may, but need not, be detected using the input image 105 that represents the image data being projected in the Panini projection (e.g., object detection may additionally or alternatively be applied using some other sensor data, such as RADAR or LiDAR data).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 9A:
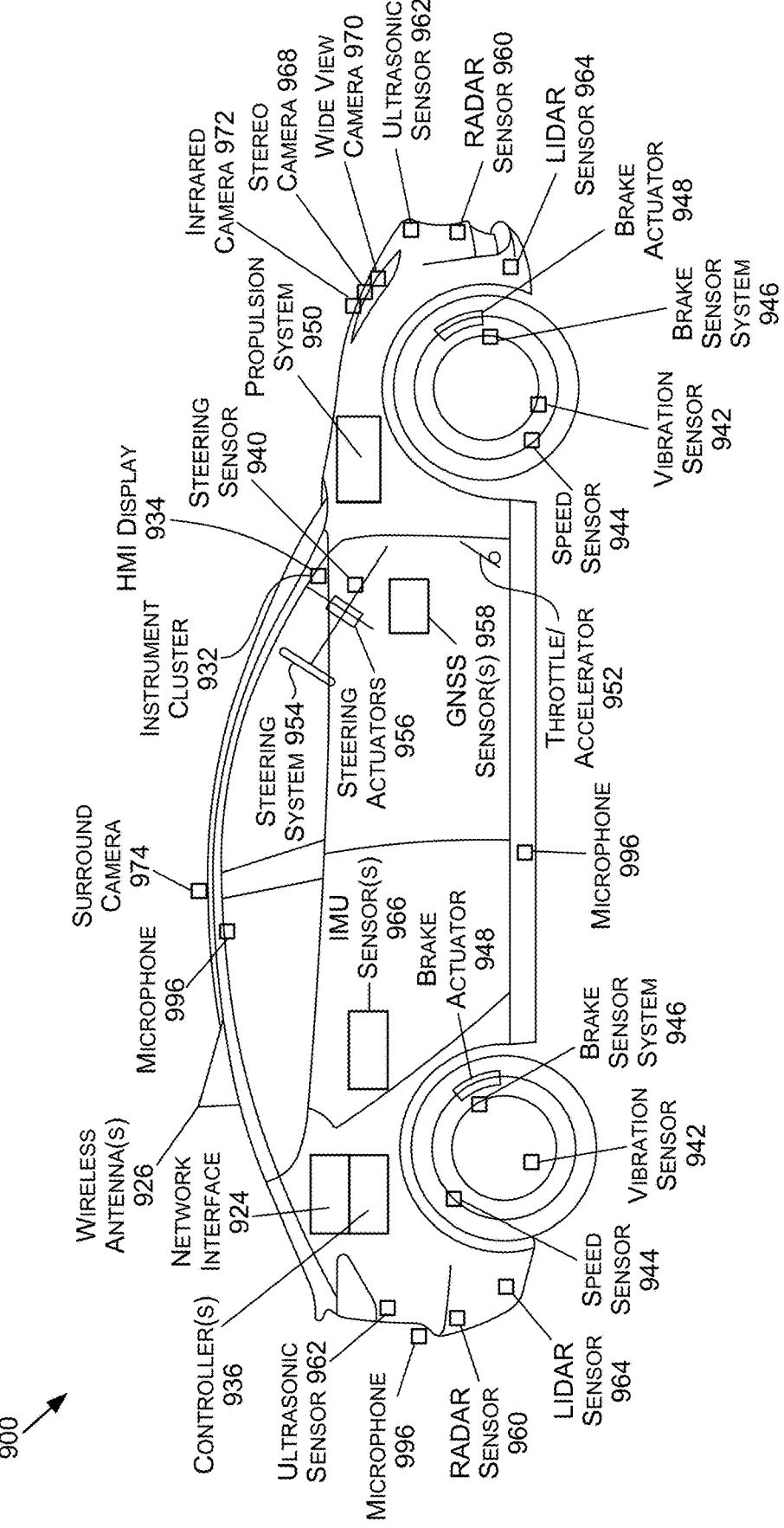
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
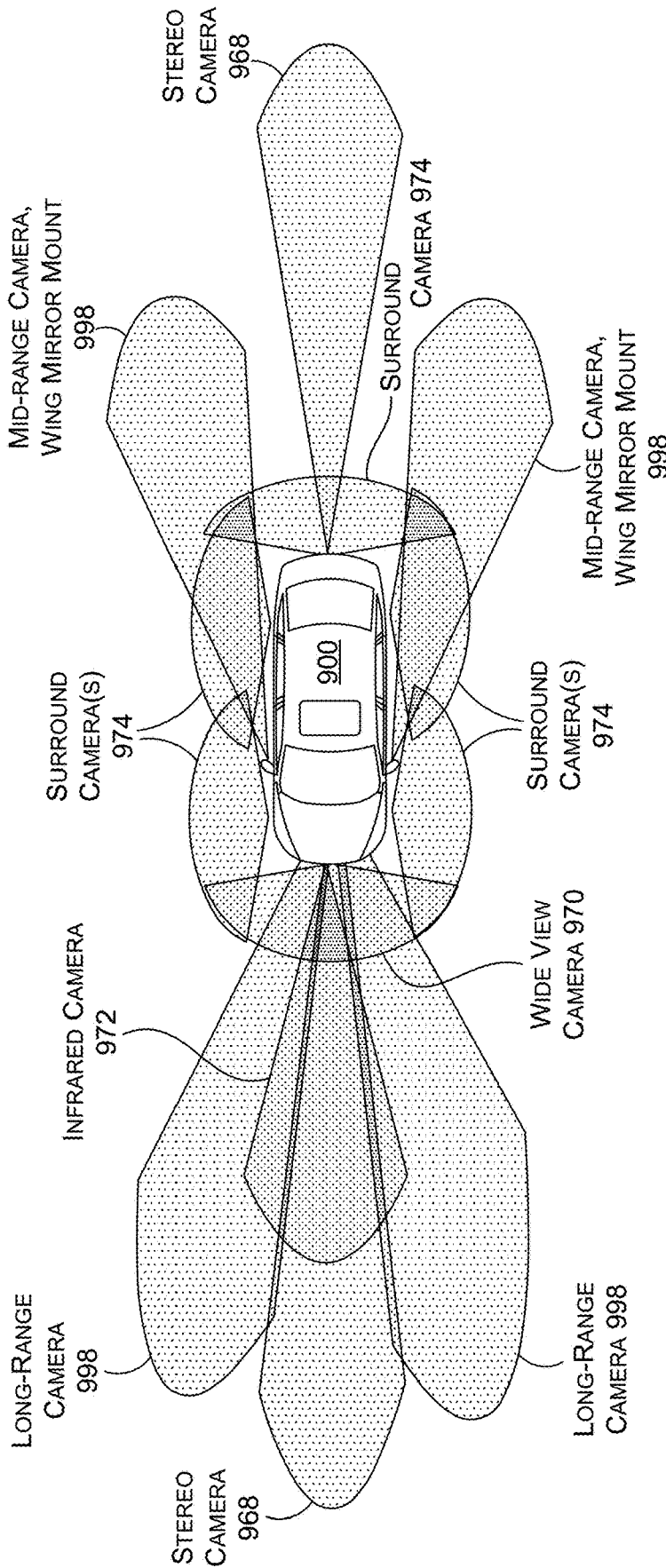
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
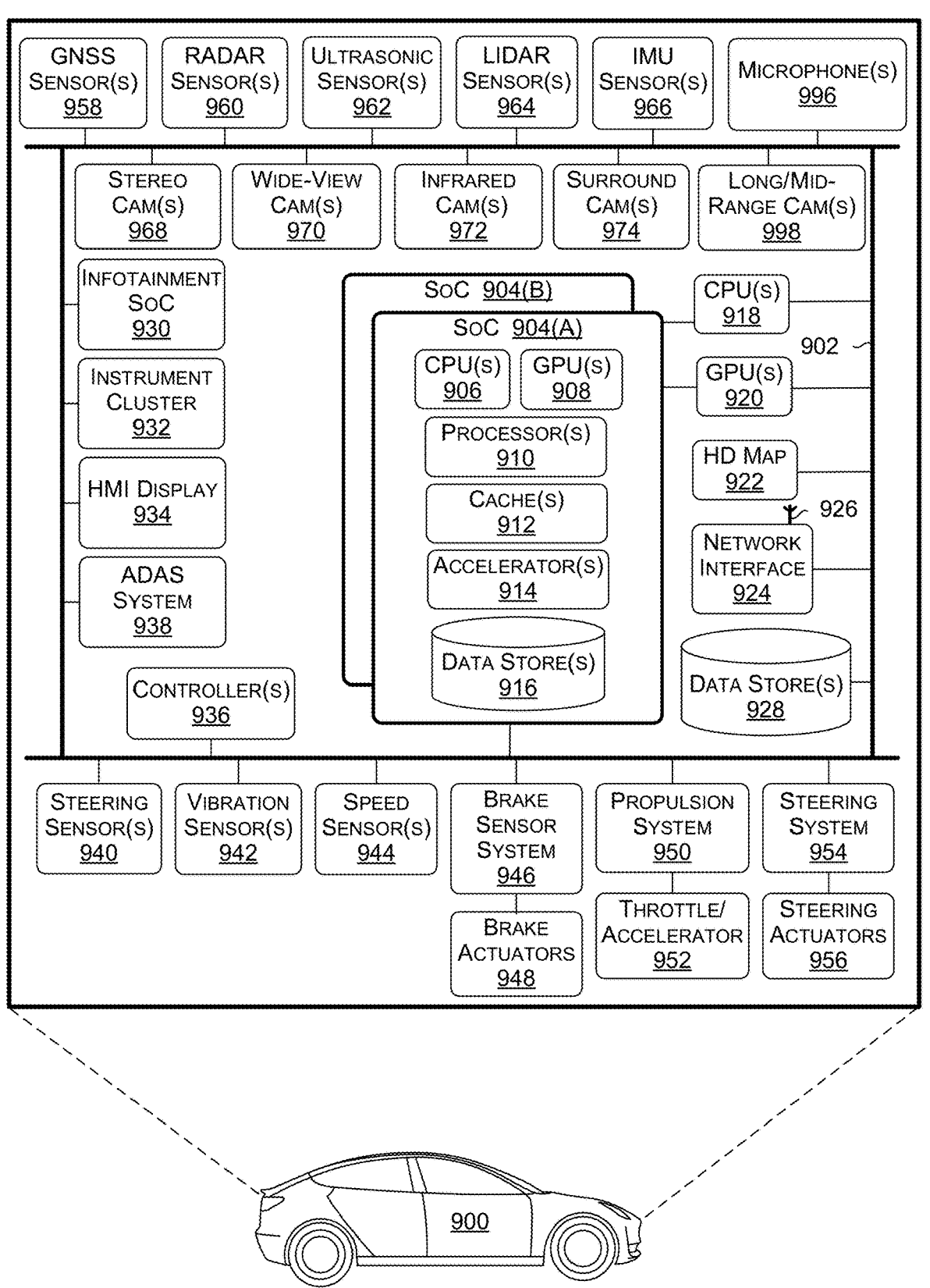
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In I some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s)

912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learn-
ing), rule-based machine learning, anomaly detection, and
any variants or combinations therefor. Once the machine
learning models are trained, the machine learning models
may be used by the vehicles (e.g., transmitted to the vehicles
over the network(s) 990, and/or the machine learning mod-
els may be used by the server(s) 978 to remotely monitor the
vehicles.

In some examples, the server(s) 978 may receive data
from the vehicles and apply the data to up-to-date real-time
neural networks for real-time intelligent inferencing. The
server(s) 978 may include deep-learning supercomputers
and/or dedicated AI computers powered by GPU(s) 984,
such as a DGX and DGX Station machines developed by
NVIDIA. However, in some examples, the server(s) 978
may include deep learning infrastructure that use only
CPU-powered datacenters.

The deep-learning infrastructure of the server(s) 978 may
be capable of fast, real-time inferencing, and may use that
capability to evaluate and verify the health of the processors,
software, and/or associated hardware in the vehicle 900. For
example, the deep-learning infrastructure may receive peri-
odic updates from the vehicle 900, such as a sequence of
images and/or objects that the vehicle 900 has located in that
sequence of images (e.g., via computer vision and/or other
machine learning object classification techniques). The
deep-learning infrastructure may run its own neural network
to identify the objects and compare them with the objects
identified by the vehicle 900 and, if the results do not match
and the infrastructure concludes that the AI in the vehicle
900 is malfunctioning, the server(s) 978 may transmit a
signal to the vehicle 900 instructing a fail-safe computer of
the vehicle 900 to assume control, notify the passengers, and
complete a safe parking maneuver.

For inferencing, the server(s) 978 may include the GPU(s)
984 and one or more programmable inference accelerators
(e.g., NVIDIA's TensorRT). The combination of GPU-
powered servers and inference acceleration may make real-
time responsiveness possible. In other examples, such as
where performance is less critical, servers powered by
CPUs, FPGAs, and other processors may be used for infer-
encing.

Example Computing Device

Figure 10:
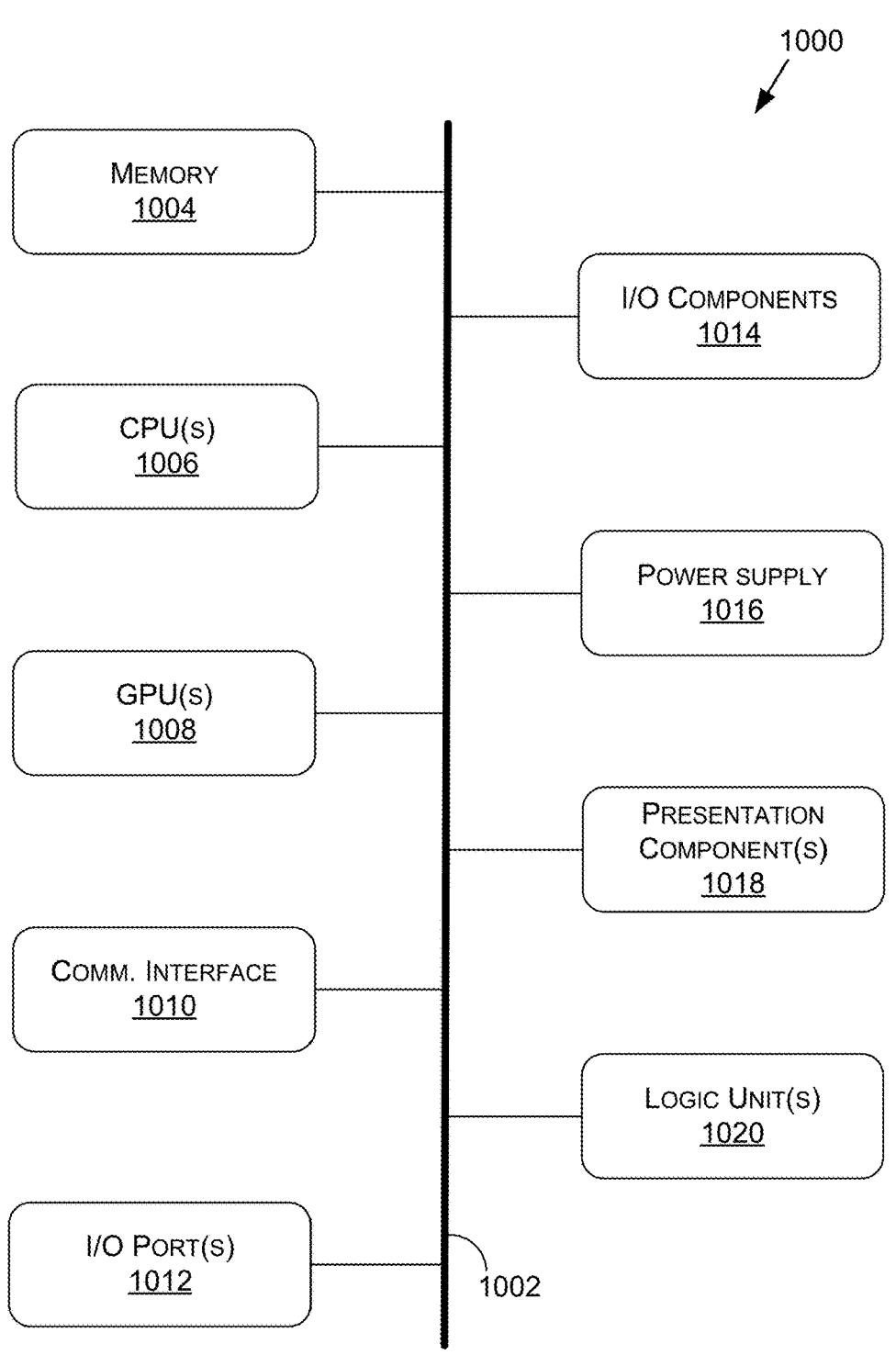
FIG. 10 is a block diagram of an example computing device suitable for use in implementing some embodiments of the present disclosure.

FIG. 10 is a block diagram of an example computing
device(s) 1000 suitable for use in implementing some
embodiments of the present disclosure. Computing device
1000 may include an interconnect system 1002 that directly
or indirectly couples the following devices: memory 1004,
one or more central processing units (CPUs) 1006, one or
more graphics processing units (GPUs) 1008, a communi-
cation interface 1010, input/output (I/O) ports 1012, input/
output components 1014, a power supply 1016, one or more
presentation components 1018 (e.g., display(s)), and one or
more logic units 1020. In at least one embodiment, the
computing device(s) 1000 may comprise one or more virtual
machines (VMs), and/or any of the components thereof may
comprise virtual components (e.g., virtual hardware com-
ponents). For non-limiting examples, one or more of the
GPUs 1008 may comprise one or more vGPUs, one or more
of the CPUs 1006 may comprise one or more vCPUs, and/or
one or more of the logic units 1020 may comprise one or
more virtual logic units. As such, a computing device(s)
1000 may include discrete components (e.g., a full GPU
dedicated to the computing device 1000), virtual compo-
nents (e.g., a portion of a GPU dedicated to the computing
device 1000), or a combination thereof.

Although the various blocks of FIG. 10 are shown as
connected via the interconnect system 1002 with lines, this
is not intended to be limiting and is for clarity only. For
example, in some embodiments, a presentation component
1018, such as a display device, may be considered an I/O
component 1014 (e.g., if the display is a touch screen). As
another example, the CPUs 1006 and/or GPUs 1008 may
include memory (e.g., the memory 1004 may be represen-
tative of a storage device in addition to the memory of the
GPUs 1008, the CPUs 1006, and/or other components). In
other words, the computing device of FIG. 10 is merely
illustrative. Distinction is not made between such categories
as "workstation," "server," "laptop," "desktop," "tablet,"
"client device," "mobile device," "hand-held device,"
"game console," "electronic control unit (ECU)," "virtual
reality system," and/or other device or system types, as all
are contemplated within the scope of the computing device
of FIG. 10.

The interconnect system 1002 may represent one or more
links or busses, such as an address bus, a data bus, a control
bus, or a combination thereof. The interconnect system 1002
may include one or more bus or link types, such as an
industry standard architecture (ISA) bus, an extended indus-
try standard architecture (EISA) bus, a video electronics
standards association (VESA) bus, a peripheral component
interconnect (PCI) bus, a peripheral component interconnect
express (PCIe) bus, and/or another type of bus or link. In
some embodiments, there are direct connections between
components. As an example, the CPU 1006 may be directly
connected to the memory 1004. Further, the CPU 1006 may
be directly connected to the GPU 1008. Where there is
direct, or point-to-point connection between components,
the interconnect system 1002 may include a PCIe link to
carry out the connection. In these examples, a PCI bus need
not be included in the computing device 1000.

The memory 1004 may include any of a variety of
computer-readable media. The computer-readable media
may be any available media that may be accessed by the
computing device 1000. The computer-readable media may
include both volatile and nonvolatile media, and removable
and non-removable media. By way of example, and not
limitation, the computer-readable media may comprise com-
puter-storage media and communication media.

The computer-storage media may include both volatile
and nonvolatile media and/or removable and non-removable
media implemented in any method or technology for storage
of information such as computer-readable instructions, data
structures, program modules, and/or other data types. For
example, the memory 1004 may store computer-readable
instructions (e.g., that represent a program(s) and/or a pro-
gram element(s), such as an operating system. Computer-
storage media may include, but is not limited to, RAM,
ROM, EEPROM, flash memory or other memory technol-
ogy, CD-ROM, digital versatile disks (DVD) or other optical
disk storage, magnetic cassettes, magnetic tape, magnetic
disk storage or other magnetic storage devices, or any other
medium which may be used to store the desired information
and which may be accessed by computing device 1000. As
used herein, computer storage media does not comprise
signals per se.

The computer storage media may embody computer-
readable instructions, data structures, program modules,
and/or other data types in a modulated data signal such as a
carrier wave or other transport mechanism and includes any
information delivery media. The term "modulated data sig-
nal" may refer to a signal that has one or more of its
characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
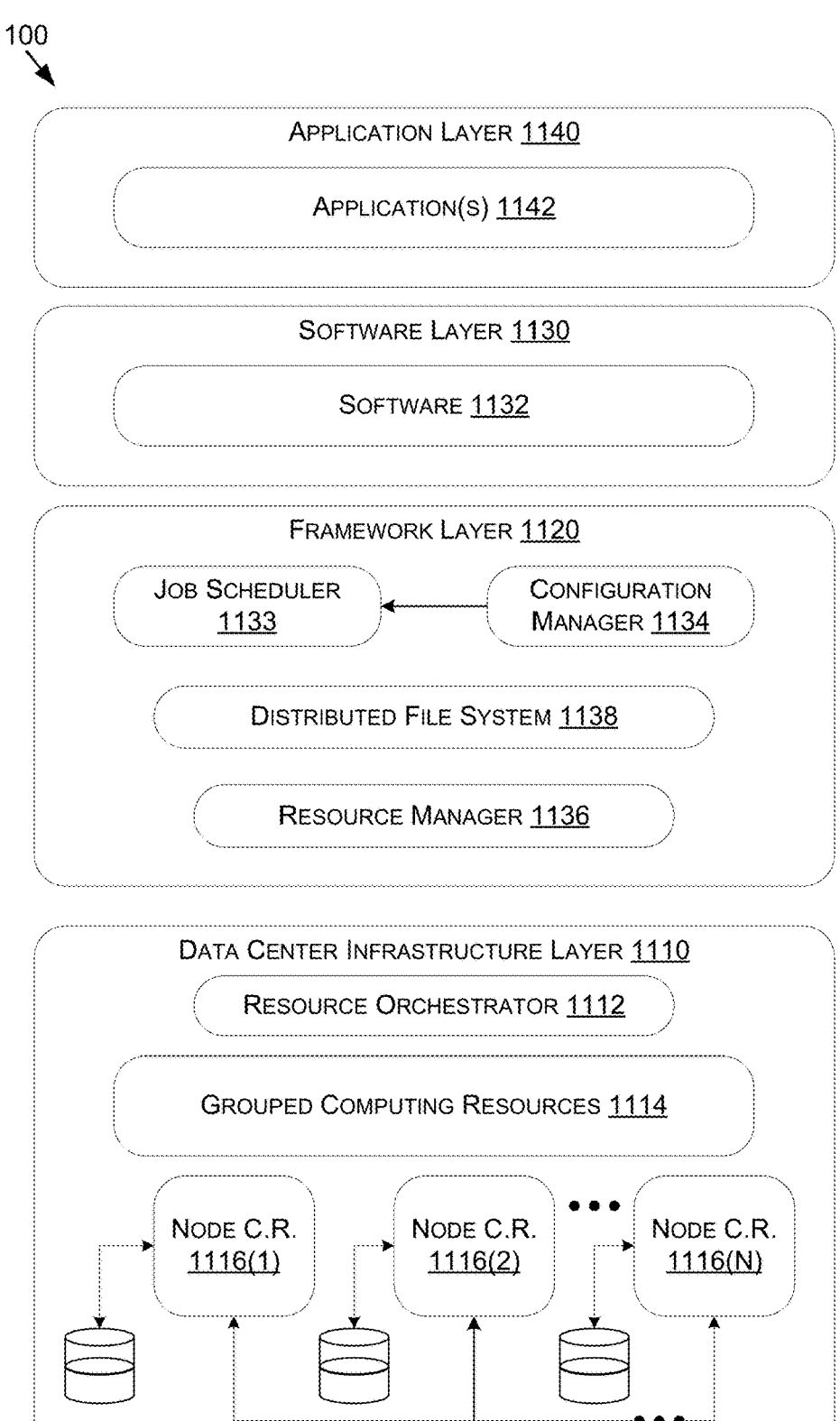
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-1116(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more processing units to:
receive image data representing an environment; and
generate a visualization of the environment: based at least on a Panini projection of the image data using one or more parameters determined based at least on detected scene content, and using vanishing point detection to determine whether to apply distortion correction.

2. The processor of claim 1, wherein the Panini projection comprises a cylindrical projection of a three-dimensional (3D) cylinder that adaptively models the environment with a shape based at least on one or more distances to one or more detected objects in the environment.

3. The processor of claim 1, wherein the Panini projection comprises a rectilinear projection that uses a view positioned based at least on detecting a substantially horizontal line using horizontal line detection.

4. The processor of claim 1, the one or more processing units further to apply horizontal line detection to determine whether a rectilinear projection of the image data includes one or more substantially horizontal lines.

5. The processor of claim 1, the one or more processing units further to determine, based at least on the vanishing point detection identifying an absence of a vanishing point in a rectilinear projection of the image data, to apply the distortion correction to a projection image generated using the Panini projection.

6. The processor of claim 1, the one or more processing units further to determine, based at least on detecting one or more substantially horizontal lines in a rectilinear projection of the image data, to apply the distortion correction to a projection image generated using the Panini projection.

7. The processor of claim 1, the one or more processing units further to generate the visualization based at least on applying vertical compression to at least a portion of a projection image generated using the Panini projection.

8. The processor of claim 1, the one or more processing units further to generate the visualization based at least on applying vertical compression, to at least a portion of a projection image generated using the Panini projection, the vertical compression corresponding to a variable compression factor that is a function of horizontal position in the projection image.

9. The processor of claim 1, the one or more processing units further to:
generate a compressed image based at least on applying vertical compression to at least a portion of a projection image generated using the Panini projection; and
cropping out one or more rows of the compressed image that include null pixels.

10. The processor of claim 1, wherein the processor is comprised in at least one of:
a control system for an autonomous or semi-autonomous machine;
a perception system for an autonomous or semi-autonomous machine;

a system for performing simulation operations;
a system for performing digital twin operations;
a system for performing light transport simulation;
a system for performing collaborative content creation for 3D assets;
a system for performing deep learning operations;
a system for performing real-time streaming;
a system implemented using an edge device;
a system implemented using a robot;
a system for performing conversational AI operations;
a system for generating synthetic data;
a system for generating synthetic data using AI;
a system incorporating one or more virtual machines (VMs);
a system implemented at least partially in a data center; or
a system implemented at least partially using cloud computing resources.

11. A system comprising:
one or more processing units to generate a visualization of an environment based at least on a Panini projection and using vanishing point detection to determine whether to apply distortion correction to a projection image generated using the Panini projection, the Panini projection being computed using one or more parameters corresponding to detected scene content.

12. The system of claim 11, wherein the Panini projection comprises a cylindrical projection that uses a three-dimensional (3D) cylinder to adaptively model the environment with a shape based at least on one or more distances to one or more detected objects in the environment.

13. The system of claim 11, wherein the Panini projection comprises a rectilinear projection that uses a view positioned based at least on detecting a substantially horizontal line using horizontal line detection.

14. The system of claim 11, the one or more processing units further to determine, based at least on the vanishing point detection identifying an absence of a vanishing point in a rectilinear projection of image data of the environment, to apply the distortion correction to the projection image generated using the Panini projection.

15. The system of claim 11, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing deep learning operations;
a system for performing real-time streaming;
a system implemented using an edge device;
a system implemented using a robot;
a system incorporating one or more virtual machines (VMs);
a system implemented at least partially in a data center;
a system for performing light transport simulation;
a system for performing collaborative content creation for 3D assets;
a system for generating synthetic data;
a system for generating synthetic data using AI; or
a system implemented at least partially using cloud computing resources.

16. A method comprising:
detecting content corresponding to image data representing an environment; and
generating a visualization of the environment based at least on a rectilinear projection of a cylindrical projection of image data of the environment and using vanishing point detection to determine whether to apply distortion correction to a corresponding projection image, at least one of the cylindrical projection or the rectilinear projection using one or more parameters determined based at least on the detected content.

17. The method of claim 16, wherein the cylindrical projection uses a three-dimensional (3D) cylinder that adaptively models the environment with a shape based at least on one or more distances to one or more detected objects in the environment.

18. The method of claim 16, wherein the rectilinear projection uses a view positioned based at least on detecting a substantially horizontal line using horizontal line detection.

19. The method of claim 16, wherein the generating of the visualization is based at least on:

detecting one or more substantially horizontal lines in a first rectilinear projection of the image data; and determining, based at least on the detecting the one or more substantially horizontal lines in the first rectilinear projection, to apply the distortion correction to a projection image generated using the rectilinear projection of the cylindrical projection of the image data.

20. The method of claim 16, wherein the method is performed by at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system implemented using an edge device;

a system implemented using a robot;

a system for performing conversational AI operations;

a system for generating synthetic data;

a system for generating synthetic data using AI;

a system incorporating one or more virtual machines (VMs);

a system implemented at least partially in a data center; or a system implemented at least partially using cloud computing resources.

\* \* \* \* \*